United States Patent [19]
Hagiwara et al.

[11] Patent Number: 5,164,867
[45] Date of Patent: Nov. 17, 1992

[54] MAGNETIC DISK STORAGE AND A METHOD FOR ACCESSING A TRACK IN A MAGNETIC DISK STORAGE

[75] Inventors: Masaki Hagiwara, Fujisawa; Akio Fujiwara, Sagamihara, both of Japan

[73] Assignee: Victor Company of Japan, Ltd., Yokohama, Japan

[21] Appl. No.: 520,014

[22] Filed: May 7, 1990

[30] Foreign Application Priority Data

May 10, 1989 [JP] Japan .................................. 1-116550

[51] Int. Cl.⁵ .......................... G11B 5/590; G11B 5/55
[52] U.S. Cl. ............................... 360/77.05; 360/78.06; 360/78.07; 360/98.01; 360/22
[58] Field of Search ....................... 360/18, 22, 23, 48, 360/49, 98.01, 135, 61, 63, 75, 77.02, 77.05, 77.07, 77.08, 78.04, 78.14, 77.04, 78.06, 78.07; 369/14, 275.3

[56] References Cited

U.S. PATENT DOCUMENTS

Re. 32,075 1/1986 Harrison et al. .
4,688,106 8/1987 Keller et al. ........................... 360/63
4,809,120 2/1989 Ozawa .............................. 360/77.08
4,924,160 5/1990 Tung ................................. 360/77.05

Primary Examiner—Jerry Smith
Assistant Examiner—Steven R. Garland
Attorney, Agent, or Firm—Lowe, Price, LeBlanc & Becker

[57] ABSTRACT

A magnetic disk storage and a method for accessing a track of the magnetic disk, wherein track centering processing is controlled by effecting an operation of reading a servo signal, which is prerecorded on a storage region of a first surface of a magnetic disk, by a first data head located on the first surface of the magnetic disk, and the track access processing is controlled by reading a track address, which is prerecorded on each track of a second surface of the magnetic disk, by using a second data head, which is connected to a common spindle and simultaneously moves in a same direction at a same speed together with the first data head, located on the second surface of the magnetic disk and detecting the number of tracks which the data head traverses. Thus, quick access of the data head to a desired track can be achieved.

11 Claims, 7 Drawing Sheets

$a_i$ : SERVO SIGNAL
$b_i$ : TRACK ADDRESS SIGNAL

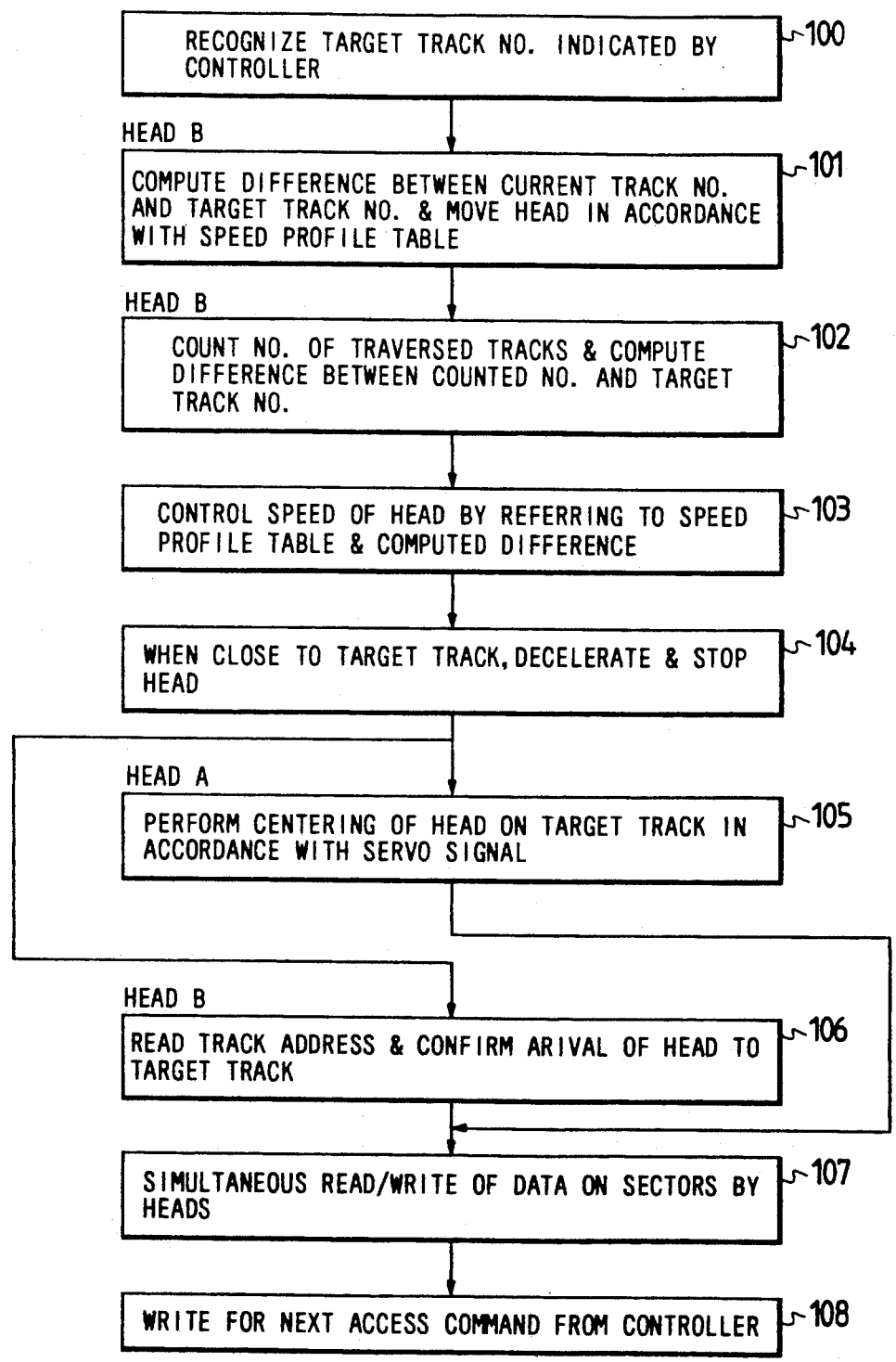

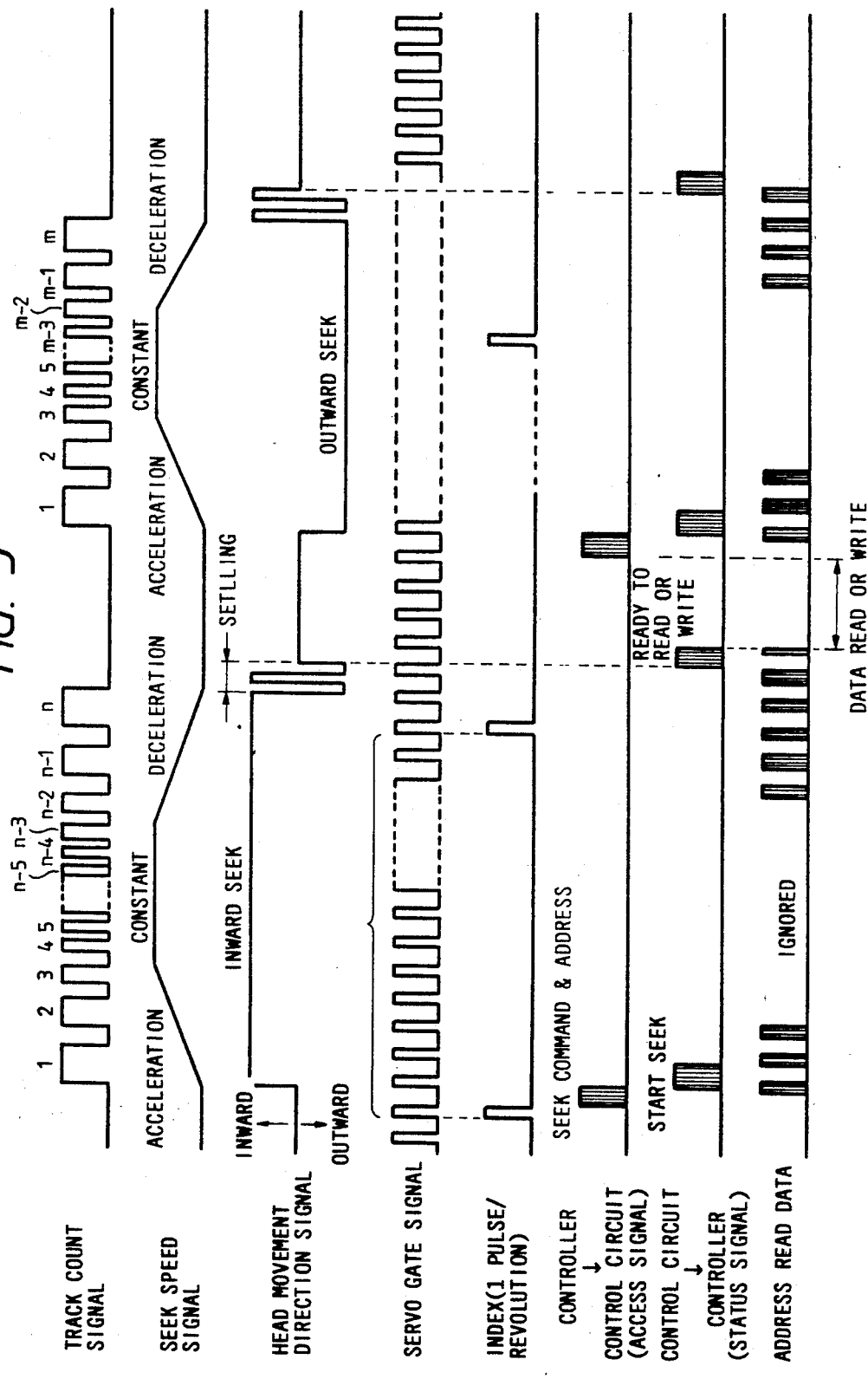

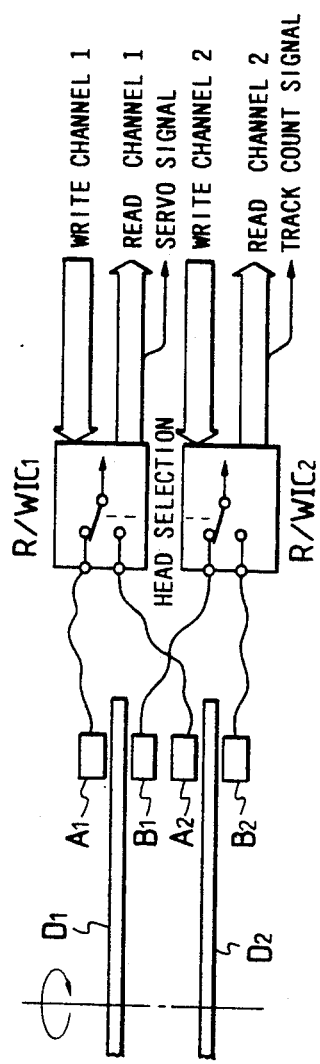
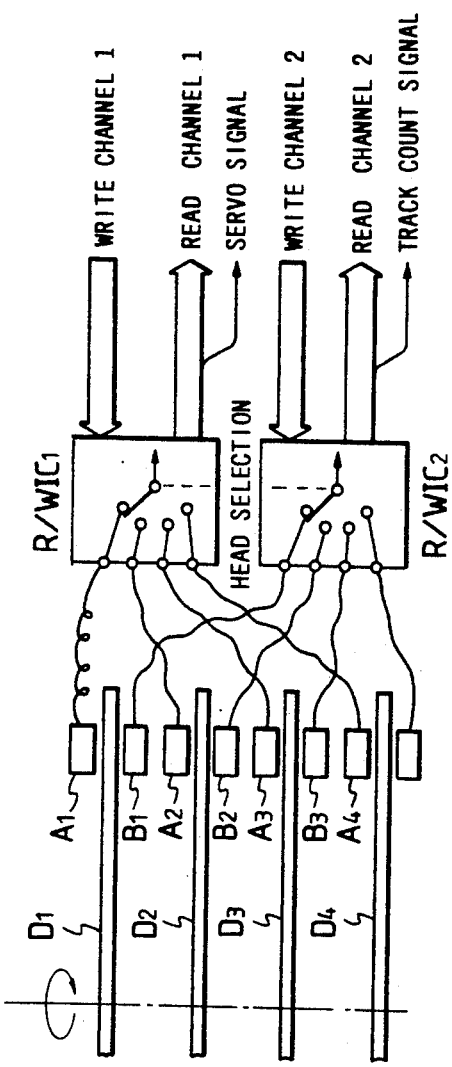

MAGNETIC DISK STORAGE AND A METHOD FOR ACCESSING A TRACK IN A MAGNETIC DISK STORAGE

BACKGROUND OF THE INVENTION

1. Field of The Invention

The present invention relates to a magnetic disk storage, which is employed as a storage device for use in a computer system etc., and to a method for accessing a track in a magnetic disk storage.

2. Description of The Related Art

Generally, in a hard disk (or rigid disk) which is usually employed as a storage device for use in a computer system etc., the positioning of a magnetic head is controlled such that the magnetic head (hereunder sometimes referred to as the data head) can have access to a desired track. Various techniques have been developed to realize rapid and accurate access of a magnetic head to a desired position in a track of a hard disk. Of such techniques, the following three practical ones are utilized for accessing a track of a hard disk.

A first one is a dedicated-servo technique which uses a surface of a disk (hereunder sometimes referred to as a servo disk surface) as dedicated to the storing of a servo signal and controls the accessing of the data head to a track and the centering of the data head on the track in accordance with an output signal read from the servo disk surface.

Further, a second one is an embedded servo technique which writes a servo signal representing track position information to a sector of each track and controls the accessing of the data head to a track and the centering of the data head on the track in accordance with a head output signal read from the sector.

Additionally, a third one is a combination of the first and second techniques.

In magnetic disk storages implementing the foregoing conventional techniques, the realization of quicker access of a data head to a corresponding disk (hereunder sometimes referred to as quick track access), provision of larger storage capacity by decreasing a track pitch and provision of high-speed data transfer, etc. are always required.

However, when attempting to achieve the quick track access, an error due to miscount may be generated in the detection of the position of the data head. Further, when attempting to effect the centering of the data head on the track (hereunder sometimes referred to simply as the track centering processing) with high precision, it is necessary to increase the area of a storage region to be used for storing the servo signal and thus to decrease the area of a storage region to be used for recording a data signal. Furthermore, when attempting to achieve the high-speed data transfer by effecting read/write operations by using the data heads in parallel with each other, a data writing signal, which is to be applied to a data head, may be applied to a servo head dedicated to a read operation, resulting in degradation of the signal-to-noise ratio (S/N) of the servo signal. The present invention is provided to eliminate these drawbacks of the prior art.

It is accordingly an object of the present invention to provide a magnetic disk storage which can realize the quick access of the data head to a track, the increase in the storage capacity and the high-speed data transfer by using two or more data heads in parallel with each other and a method for accessing a track of such a magnetic disk storage.

SUMMARY OF THE INVENTION

To achieve the foregoing object, in the magnetic disk storage of the present invention, the track centering processing is controlled by effecting an operation of reading an embedded servo signal, which is prerecorded on a storage region of a first surface of a magnetic disk, by a first data head located on the first surface of a magnetic disk, and the track access processing is controlled by reading a track address, which is prerecorded on each track of a second surface of the magnetic disk, by using a second data head, which is connected to a common spindle and simultaneously moves in a same direction at a same speed together with the first data head, located on the second surface of the magnetic disk and detecting the number of tracks which the data head traverses. Thus, the quick access of the data heads to a desired track can be achieved. Further, in the magnetic disk storage of the present invention, the embedded servo signal is not recorded on the second surface and a track count signal representing the number of tracks counted at the time when the data head traverses a track is obtained from a reproduced signal from the second surface of the magnetic disk. Thereby the occurrence of a miscount at the time of traversing the servo signal can be prevented.

Namely, in accordance with a first aspect of the present invention, there is provided a method for accessing a track of a magnetic disk storage by using a pair of first and second magnetic heads capable of respectively accessing a first and second surfaces of a magnetic disk and moving together with each other, which comprises the steps of writing a servo signal to be used for the centering of the magnetic heads on a track into a sector other than data sectors used for storing data of each track on the first surface of the magnetic disk by using the first magnetic head, then writing a track address signal in a predetermined location of each track on the second surface of the magnetic disk by using the second magnetic head while the tracking of the magnetic heads is controlled in accordance with the servo signal read by using the first magnetic head and, at the time of reading/writing of data, controlling an access of the first or second magnetic head to a target track of the magnetic disk by determining a currently accessed track by a signal outputted from the second magnetic head and further determining the number of tracks traversed by the second magnetic head by the signal outputted from the second magnetic head, and controlling the centering of the first or second magnetic head on a track by using the servo signal read by using the first magnetic head.

Further, in accordance with a second aspect of the present invention, there is provided a magnetic disk storage having at least one magnetic disk, rotation controlling means for controlling the rotation of the magnetic disk, a first magnetic head adapted to access a first surface of the magnetic disk, a second magnetic head adapted to move together with the first magnetic head and access a second surface of the magnetic disk, tracking control means for controlling the tracking of the first and second magnetic heads, signal transmitting means for sending signals to and receiving signals from the first and second magnetic heads, signal transmitting means for sending signals to and receiving signals from said first and second magnetic heads; and signal transmission control means for controlling the signal transmitting means, wherein the tracking control means comprises track centering control means for controlling the centering of the first or second magnetic head on a predetermined track by using an embedded servo signal recorded on the first surface read by the first magnetic head and track accessing control means for controlling an access of the first or second magnetic head to a track, which should be accessed, by determining a track number of a currently accessed track by a signal outputted from said second magnetic head, computing a first difference between the track number of the currently accessed track and that of a target track to be accessed, establishing a direction, in which said second magnetic head should be moved, and a speed, at which said second magnetic head should be moved, on the basis of the determined first difference, moving said second magnetic head in the established direction at the established speed, determining the number of tracks which the second magnetic head has traversed from a signal outputted from said moved second magnetic head, computing a second difference between the track number of the target track and the determined number of the tracks which the second magnetic head has traversed, and controlling the speed of said second magnetic head on the basis of the computed second difference.

Furthermore, in the magnetic disk storages embodying the present invention, which will be described in detail later, data represented by using a plurality of bits is divided into two partial data and then these partial data are written on the first and second surfaces of the magnetic disk, respectively. Thus, the high-speed data transfer can be achieved without reducing the storage capacity of the magnetic disk storage. Additionally, in the magnetic disk storages embodying the present invention, a plurality of magnetic disks and a plurality of pairs of magnetic heads are selectively, switchably, used. Thus, the storage capacity of the magnetic disk head can be increased. Moreover, in one of the magnetic disk storages embodying the present invention, each bit of data is written on a different one of the surfaces of a plurality of magnetic disks. Thus, serial/parallel conversion and the parallel/serial conversion become unnecessary and the high-speed transfer of the data can be achieved.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 4 is a flowchart for illustrating an operation of a microcomputer composing a control circuit 9 of the magnetic disk storage of FIG. 1;

FIG. 5 is a time chart for illustrating an operation of the microcomputer composing the control circuit 9 of the magnetic disk storage of FIG. 1; and FIGS. 6, 7 and 8 are schematic block diagrams for showing preferred embodiments of the present invention other than the first embodiment of FIG. 1.

DETAILED DESCRIPTION OF THE PREFERRED EMBODIMENTS

Hereinafter, the preferred embodiments of the present invention will be described in detail by referring to the accompanying drawings.

Figure 1:
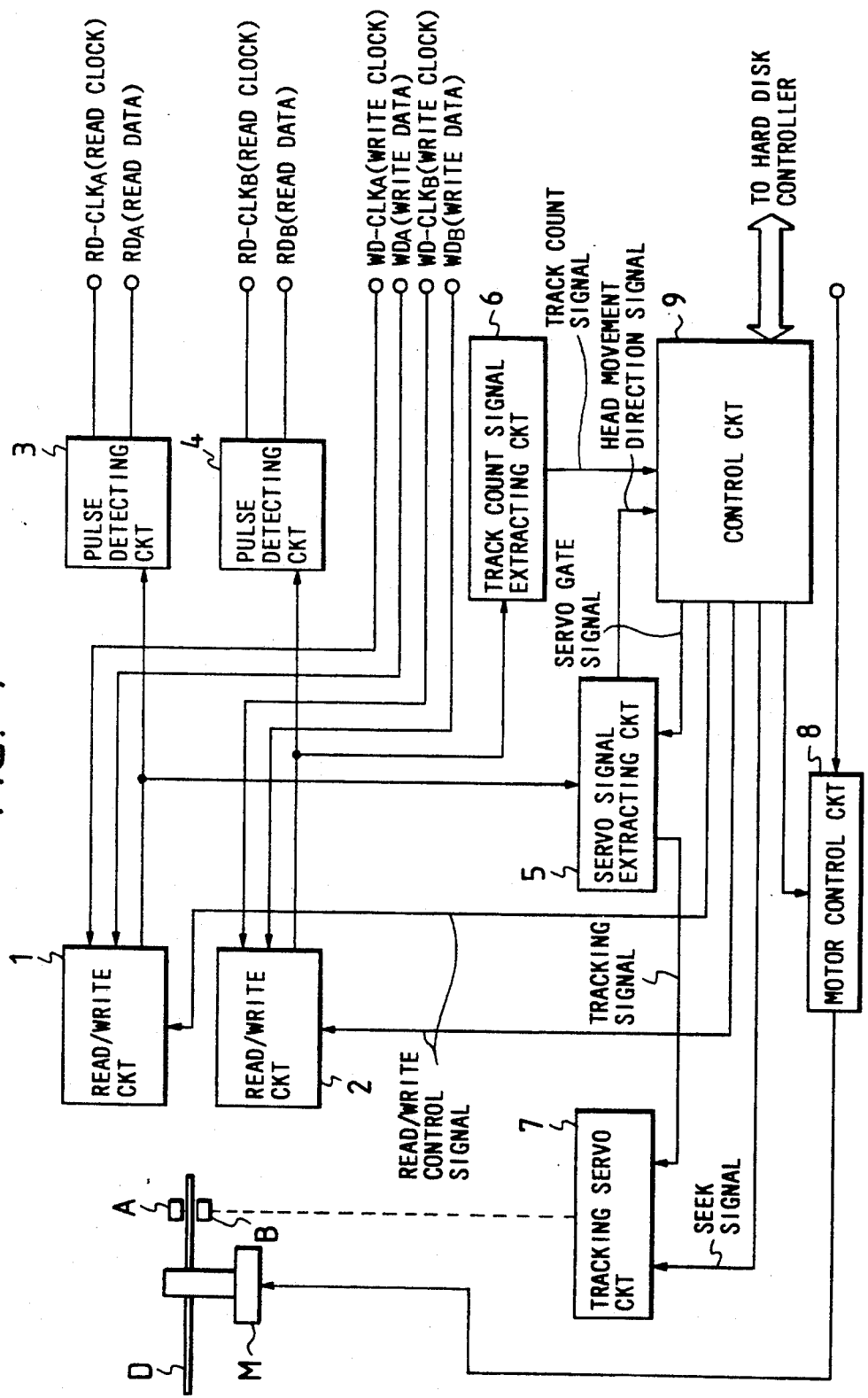
FIG. 1 is a schematic block diagram for showing the construction of a hard disk drive portion of a magnetic disk storage employing a method for accessing a track of a magnetic disk embodying the present invention.

Referring to FIG. 1, there is shown a hard disk drive portion of a magnetic disk storage employing a method for accessing a track of the hard disk according to the present invention (hereunder sometimes referred to as a first embodiment). For simplicity of description, this magnetic disk storage is described as containing only one disk. The present invention, however, can be applied to a magnetic disk storage having a plurality of disks, as will be described later.

As illustrated in this figure, a magnetic disk D is fixedly mounted on a spindle of a spindle motor M, which is controlled by a motor control circuit 8, in such a manner to be rotatable thereabout. Further, data heads A and B are connected to each other in such a manner to move in an incorporated manner. A tracking servo circuit 7 controls the positions of the heads A and B. Additionally, read-write circuits (or recording and reproducing circuits) 1 and 2 are respectively connected to the data heads A and B. Further, outputs of read-write circuits 1 and 2 are respectively connected to pulse detecting circuits 3 and 4. Moreover, the output of the read-write circuit 1 corresponding to the data head A is also supplied to a servo signal extracting circuit 5 which outputs two kinds of signals. One is a signal indicating a direction of a movement of the data head (hereunder referred to simply as a head movement direction signal) and is supplied to a control circuit 9. The other is a tracking signal which is fed to the tracking servo circuit 7. Furthermore, the output of the read-write circuit 2 corresponding to the data head B is also supplied to a track count signal extracting circuit 6 which outputs a track count signal to the control circuit 9. This control circuit 9 is connected to a hard disk controller 10 shown in FIG. 2 and supplies a servo gate signal to the servo signal extracting circuit 5. Further, the control circuit 9 supplies a seek signal to the tracking servo circuit 7. Incidentally, a conventional one-chip microcomputer (e.g., MITSUBISHI M37700M4) may be used as the control circuit 9.

Figure 2:
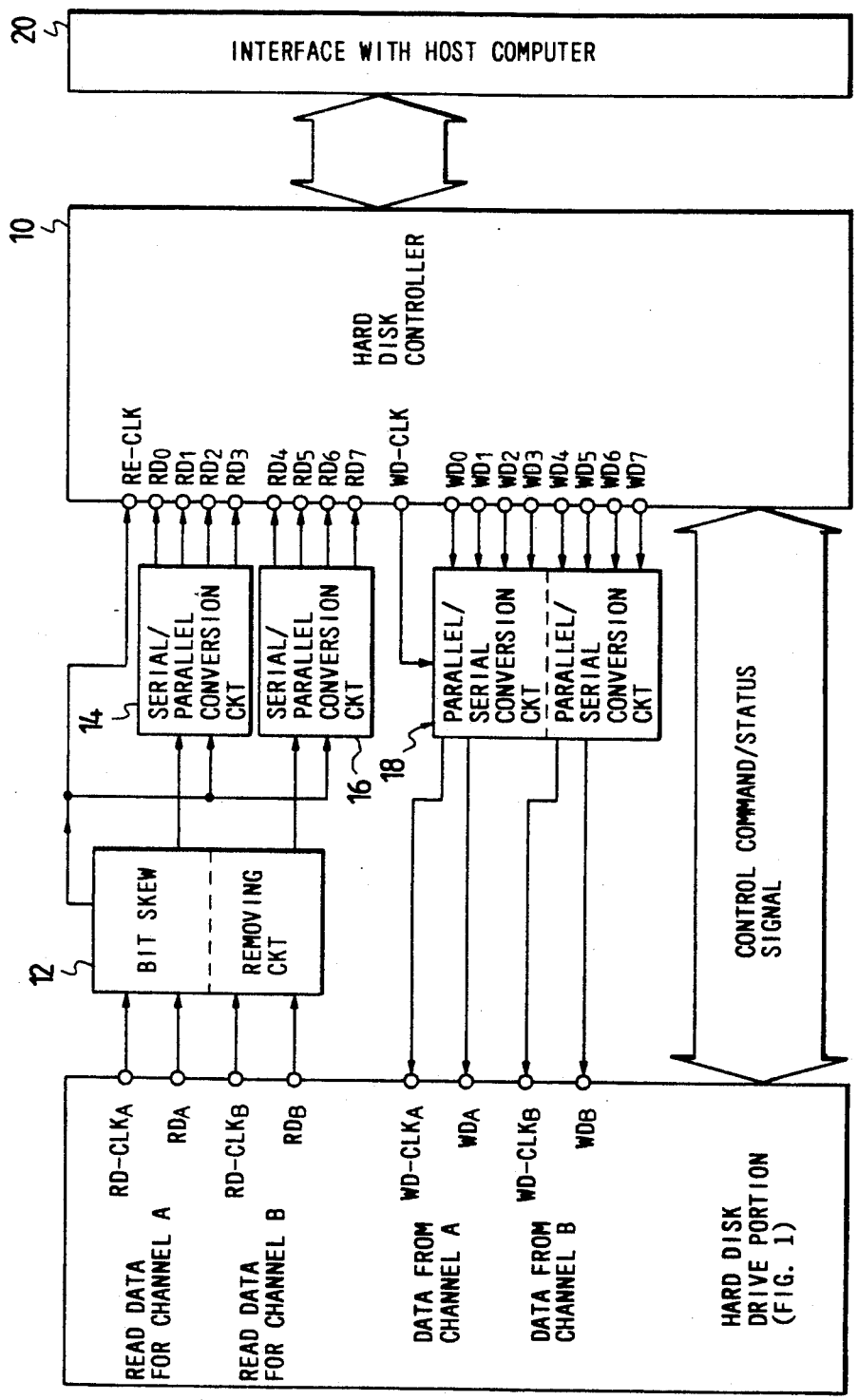
FIG. 2 is a block diagram for illustrating the connection between the hard disk drive portion of FIG. 1 and a hard disk controller and for showing the configuration of peripheral circuits of the hard disk drive portion.
Figure 3A:
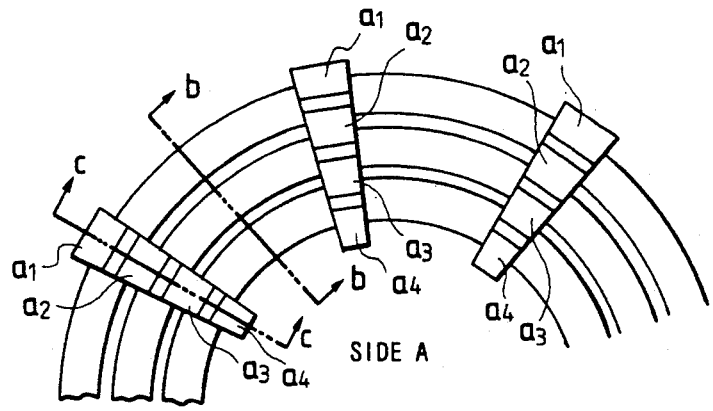
FIGS. 3(a)-3(e) are diagrams for illustrating the manner of recording signals on the top and bottom surfaces of the magnetic disk of FIG. 1.
Figure 3B:
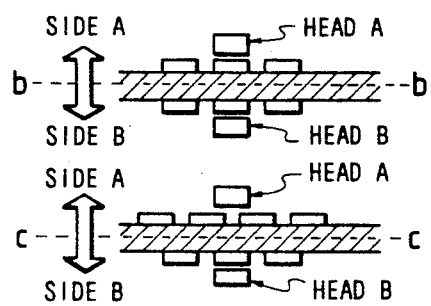
Figure 3C:
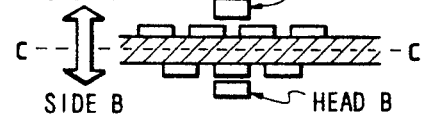
Figure 3D:
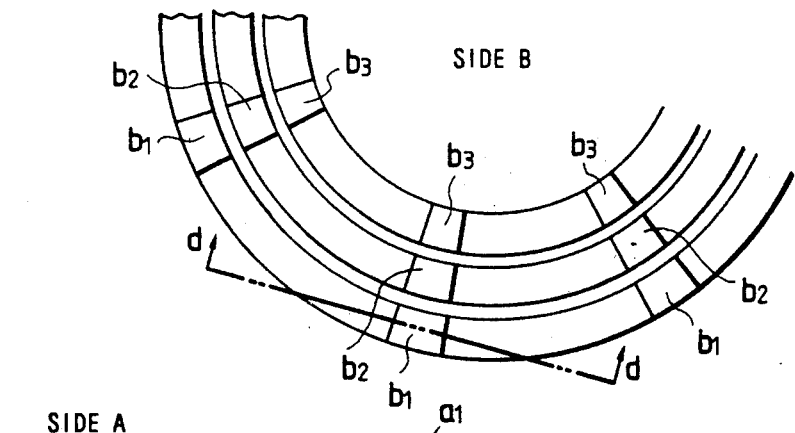
Figure 3E:
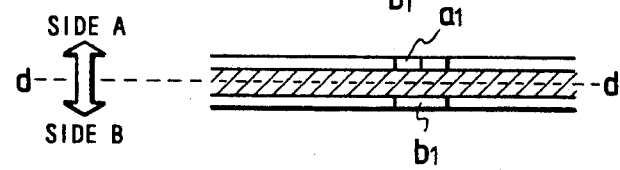

Turning to FIG. 2, there are shown peripheral circuits of the hard disk drive portion of FIG. 1. A bit skew removing circuit 12 is formed by a random-access memory (RAM) or a shift register and operates to remove the difference in time between output signals of the heads A and B (hereunder respectively referred to as an A channel signal and a B channel signal). Further, serial/parallel conversion circuits 14 and 16 are used for converting signals outputted from the circuit 12 representing serial data (hereunder referred to simply as serial signals) into signals representing parallel data (hereunder referred to simply as parallel signals). In contrast, parallel/serial conversion circuits 18 are used for converting parallel signals outputted from hard disk controller 10 into serial signals. In this embodiment, there is performed an 8-bit parallel signal transmission between a host computer and an interface 20 therewith.

When a write operation is effected, data represented by high order four bits of 8-bit data sent from the host computer is first changed by the hard disk controller 10 into data indicated by signals $WD_0$ through $WD_3$. Then, the data indicated by signals $WD_0$ through $WD_3$ is converted by a parallel/serial conversion circuit 18 into data represented by a signal $WD_A$. Further, the data obtained by the conversion circuit 18 is supplied to the data head A through the read-write circuit 1 of FIG. 1. On the other hand, data represented by low order four bits of 8-bit data sent from the host computer is first changed by the hard disk controller 10 into data indicated by signals $WD_4$ through $WD_7$. Then, the data indicated by signals $WD_4$ through $WD_7$ is converted by the parallel/serial conversion circuit 18 into data represented by a signal $WD_B$. Further, the data obtained by the conversion circuit 18 is supplied to the data head B through the read-write circuit 2 of FIG. 1. In contrast, when a read operation is effected, a signal $RD_A$ representing 4-bit data read by the data head A and another signal $RD_B$ representing 4-bit data are inputted to the bit skew removing circuit 12, whereupon the difference in time between the signals $RD_A$ and $RD_B$ is removed. Thereafter, serial data outputted from the circuit 12 is converted by the serial/parallel conversion circuits 14 and 16 into two parallel data. Signals representing the thus obtained parallel data are supplied to input terminals $RD_0$ through $RD_7$ of the hard disk controller 10, whereupon 8-bit data is synthesized. Incidentally, in FIG. 2, reference characters RD-CLK and WD-CLK denote a read clock signal and a write clock signal, respectively. Further, command signals and status signals, which are used for controlling the position of the data heads A and B and the rotating operation of the spindle motor M, are transmitted between the hard disk controller 10 and the control circuit 9 of FIG. 1.

FIG. 3 is a diagram for illustrating the manner of writing signals on the top and bottom surfaces A and B (hereunder sometimes referred to as the sides A and B) of the magnetic disk D of FIG. 1. Further, FIG. 3 (a) is a partial plan view of the side A of the disk D; and FIG. 3 (d) a partial plan view of the side B thereof. In these figures, concentric circular rings, which are partly shown for simplicity of drawing, designate concentric circular tracks. Further, in FIG. 3 (a), reference characters $a_1, a_2, a_3 \ldots$ denote embedded servo signals written or recorded on sectors, each of which is shifted from an adjacent track by half of a track pitch, on the side A of the magnetic disk. Moreover, in FIG. 3 (d), reference characters $b_1, b_2, b_3, \ldots$ denote track address signals written or recorded on tracks on the side B of the magnetic disk. Furthermore, FIG. 3 (b) is a cross-sectional view taken on lines b—b of FIG. 3 (a); FIG. 3 (c) a cross-sectional view taken on line c—c of FIG. 3 (a); and FIG. 3 (e) a cross-sectional view taken on line d—d of FIG. 3 (d). As is seen from FIGS. 3 (a) and (b), the servo signals and the track address signals are written on the radially arranged sectors of the tracks. Further, such servo signals and track address signals need to be preliminarily written on the sectors by using the data heads A and B. To this end, first, the servo signal is written on the side A by, for example, recording two kinds of signals, which are different in frequency from each other, thereon, alternately. Then, reading the written servo signal, the track address signal is written on the side B.

Hereinafter, an operation of the first embodiment will be described by referring to FIGS. 4 and 5 on the supposition that the servo signal and the track address signals are written on sides A and B, respectively.

Referring first to FIG. 4, which is a flowchart of a processing program to be executed by the microcomputer composing the control circuit 9 of FIG. 1, in step 100, the microcomputer recognizes the number of a track (hereunder sometimes referred to as a target track No.) to be accessed. Next, the program advances to step 101, whereupon the microcomputer reads a current track No. stored in the control circuit 9 in accordance with a signal outputted from the data head B and then computes the difference between the current track No. and the target track No., thereby establishing the direction of the movement (i.e., an outward or inward radial direction) and the velocity of the data head. Thereafter, the control circuit 9 outputs a seek signal and makes the data head move in the established direction at the established speed. Then, the program advances to step 102, whereupon the microcomputer counts the number of tracks, which the data head has traversed, by using a track count signal issued on the basis of the signal outputted from the head B and then computes the difference between the target track No. and the counted number of the traversed tracks. Subsequently, the program enters step 103, whereupon the microcomputer controls the speed of the data head by using the result of operation effected in step 102 and by referring to a speed profile table stored in the control circuit 9 (namely, the microcomputer accelerates or decelerates the data head or keeps the velocity of the data head constant as indicated by a seek speed signal of FIG. 5. Then, the program advances to step 104, whereupon when the microcomputer senses from the result of the operation effected in step 102 that the data head comes close to the target track, the microcomputer decelerates the data head and stops it on the target track. Next, the magnetic disk storage performs parallel processing of steps 105 and 106 of the program under control of the circuit 9. Namely, in step 105, the control circuit 9 causes the servo signal extracting circuit 5 to perform the processing of centering the data head on the target track by using the servo signal from the data head A. On the other hand, in step 106 (corresponding to the processing settling of the data head indicated by the head movement direction signal of FIG. 5), the microcomputer reads the track address from the output of the data head B to confirm that the track, on which the data head is currently positioned, is the target one. If not the target track, the program turns back to step 101 (Incidentally, this is omitted in the flowchart for simplicity of drawing). If affirmatively confirmed in step 106, the writing of data to and the reading of data from data areas in sectors of tacks on the sides A and B of the magnetic disk D are simultaneously performed by using the data heads A and B in step 107. In case where the signal sent from the interface 20 indicates 8-bit data as previously described, 4-bit data represented by the highest four bits of the 8-bit data and another 4-bit data represented by the lowest four bits of the 8-bit data are written onto sides A and B, respectively. When the 8-bit data needs to be read, these 4-bit data are read from the sides A and B of the magnetic disk D and then the 8-bit data is synthesized from these 4-bit data. Upon completion of the writing and the reading of the data, the magnetic disk storage enters a wait state. Incidentally, in the above described operation of the first embodiment, the track address is first read by the hard disk controller 10 which thereafter supplies the track address thus read to the control circuit 9. In this case, the track address is read only from the output signal of the data head B. Therefore, when reading the track address, only the signals applied to the input terminals $RD_4$ through $RD_7$ are decoded and in contrast the signals applied to the input terminals $RD_0$ through $RD_3$ are ignored in the hard disk controller 10.

Next, other embodiments of the present invention will be described in detail. FIG. 6 schematically shows an embodiment having two magnetic disks which are connected to a common spindle and simultaneously rotate in a same direction at a same speed; and FIG. 7 shows another embodiment having four magnetic disks which are connected to a common spindle and simultaneously rotate in a same direction at a same speed. Similarly as in case of the first embodiment, it is supposed that in these embodiments, the servo signals are preliminarily written on side A of each of the disks $D_1$ through $D_4$ as illustrated in FIG. 3 (a) and on the other hand the track addresses are preliminarily written on side B of each of the disks $D_1$ through $D_4$ as illustrated in FIG. 3 (d). Further, two pairs of data heads ($A_1$ and $B_1$; and $A_2$ and $B_2$), which simultaneously move in a same direction at a same speed, are provided in the embodiment of FIG. 6; and four pairs of such data heads ($A_1$ and $B_1$; . . . ; and $A_4$ and $B_4$) in the embodiment of FIG. 7. Additionally, electric wires connected to the heads are switched by two read-write integrated circuits (ICs) R/W $IC_1$ and $IC_2$ as illustrated in FIGS. 6 and 7 in such a manner to select one of the pairs of the heads (Ai and Bi (i=1, 2 or . . . )). Therefore, it is apparent to those skilled in the art that the circuit of FIG. 1 can be used in these embodiments by slightly modifying connections between the heads and the read-write circuits.

Furthermore, similarly as in case of the first embodiment, when a signal indicating 8-bit data is sent from an interface 20 in these embodiments, 4-bit data represented by the highest four bits of the 8-bit data and another 4-bit data represented by the lowest four bits of the 8-bit data are written on the sides Ai and Bi of one of the magnetic disks, respectively. Thereby, the hard disk controller can perform signal processing in entirely the same way as in the case of a conventional magnetic disk storage system in which each hard disk drive has only one read/write channel. Further, the magnetic disk storage of the present invention can be implemented without essentially changing various algorithms employed in programs for the processing of data, e.g., the formatting of data, the generation of an error-correcting code (ECC), the detection and correction of an error, the retry of a command or instruction and so forth. Thus, what is called the compatibility of the interface 20 can be maintained.

Figure 8:
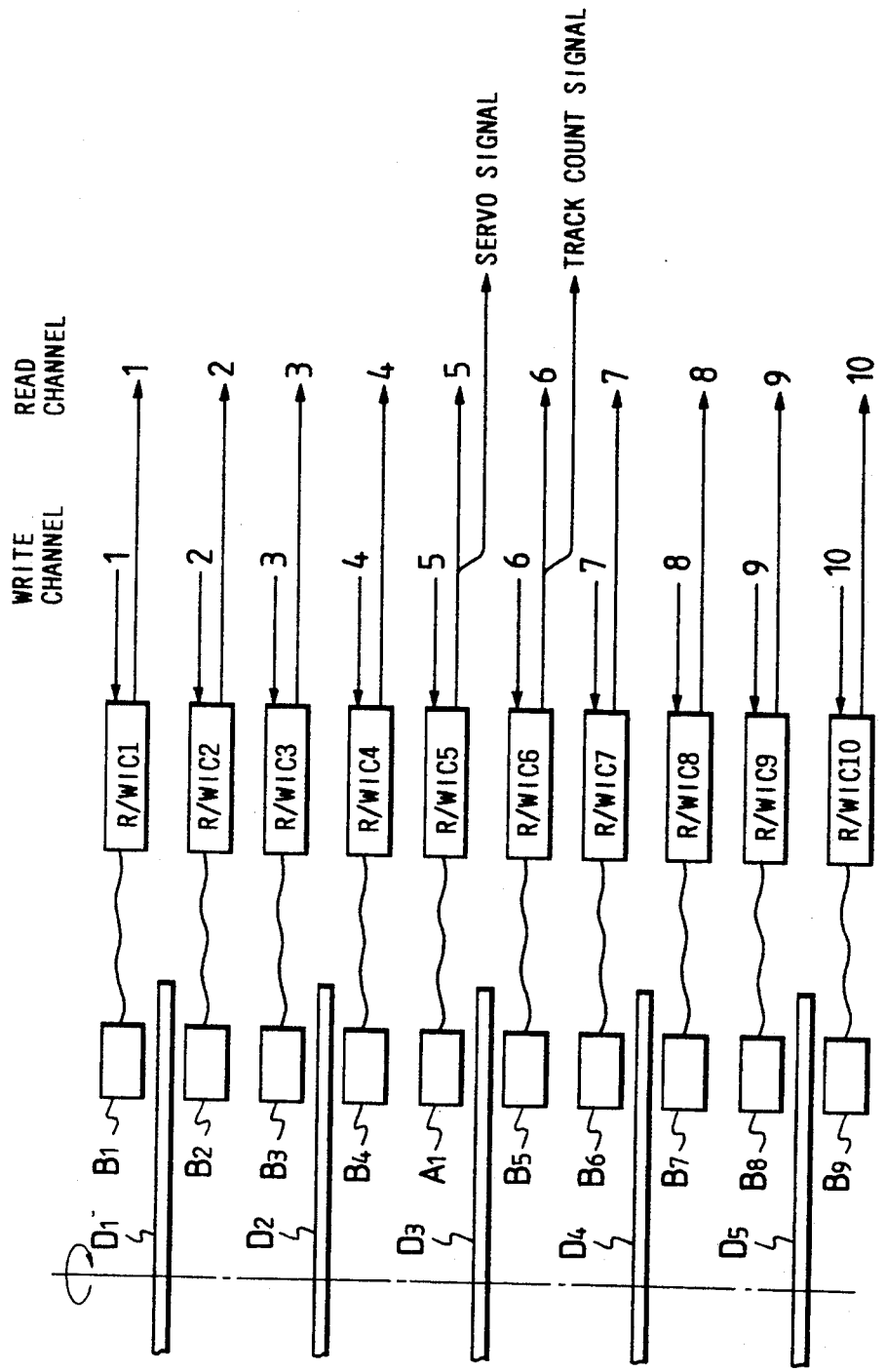

Turning now to FIG. 8, there is shown still another embodiment of the present invention, of which the number of magnetic disks ($D_1 \sim D_5$) and that of pairs of data heads ($B_1$ and $B_2$; $B_3$ and $B_4$; $A_1$ and $B_5$; $B_6$ and $B_7$; and $B_8$ and $B_9$) are increased to 5. This embodiment is further different in the following aspect from the previously described embodiments. Namely, in this embodiment, a read/write IC is provided correspondingly to each of the date heads. Thus, this embodiment can write and read 10-bit parallel data. Further, in case where a signal sent from the interface 20 indicates 8-bit parallel data, it is possible that eight bits of this 8-bit parallel data are respectively written on the surfaces of four disks and additionally parity bits etc. are written on the surfaces of the rest of the disks. Incidentally, the servo signals and the track address signals are respectively written on the sides A and B of each disk in the previously described embodiments, while these signals are written on the surfaces of one of the disks (i.e., a disk $D_3$ positioned in the center of a disk stack of FIG. 8) and are not written on the surfaces of the rest of the disks in this embodiment. It is preferable in view of deflection of the spindle and an error occurring due to a head drive mechanism that the disk positioned in the center of the disk stack is used for storing the data indicated by the servo signals and the track address signals. As above described, all of the heads are connected to the common spindle and simultaneously move in a same direction at a same speed, so that the positions of all of the heads can be accurately controlled by using the servo signals, the track address signals and the track count signals from a disk. Further, as above stated, this embodiment can perform the parallel reading/writing of a plurality of bits. Therefore, in this embodiment, the parallel/serial and serial/parallel conversions are unnecessary and the read/write of data can be effected at a high speed.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A method for accessing a track of a magnetic disk storage by using a pair of first and second magnetic heads capable of respectively accessing a first and second surfaces of a magnetic disk and moving together with each other, said method comprising the steps of:

writing a servo signal to be used for the centering of said magnetic heads on a track into a sector other than data sectors used for storing data of each track on the first surface of said magnetic disk by using the first magnetic head;

writing a track address signal in a predetermined location of each track on the second surface of said magnetic disk by using the second magnetic head while the tracking of said magnetic heads is controlled in accordance with the servo signal read by using said first magnetic head; and, when reading and/or writing data, controlling an access of said first or second magnetic head to a target track of said magnetic disk by determining a currently accessed track by a signal outputted from said second magnetic head and further determining the number of tracks traversed by the second magnetic head by the signal outputted from said second magnetic head, and controlling centering of said first or second magnetic head on a track by using the servo signal read by said first magnetic head.

2. A method for accessing a track on a magnetic disk storage as set forth in claim 1, further comprising a step of reading and/or writing data including the steps of:

dividing a digital data represented by a plurality of bits to be written to said magnetic disk storage into two data segments;

writing the two data segments on the first and second surfaces of said magnetic disk, respectively; and reading the two data segments by using said first and second magnetic heads which output first and second signals respectively representing the two data segments; and reproducing a signal representing the digital data by synthesizing the first and second signals.

3. A method for accessing a track on a magnetic disk storage as set forth in claim 1, said method further comprising the step of preliminarily selecting a magnetic disk and a pair of corresponding first and second magnetic heads from a plurality of magnetic disks and corresponding magnetic heads provided in said magnetic disk storage.

4. A method for accessing a track on said magnetic disk storage as set forth in claim 1, further comprising a step of reading and/or writing data including the steps of:

dividing a digital data represented by a plurality of bits to be written to said magnetic disk storage into a plurality of partial data each respectively representing different ones of the bits of the digital data;

writing the partial data respectively on the respective surfaces of magnetic disks provided in said magnetic disk storage; and reading the partial data by using respective magnetic heads provided correspondingly to the magnetic disks which store the partial data, a pair of said magnetic heads issuing output signals respectively representing two partial data read thereby when reading the partial data; and reproducing a signal representing the digital data by synthesizing the output signals of said magnetic heads.

5. A magnetic disk storage having at least one magnetic disk, rotation controlling means for controlling the rotation of said magnetic disk, a first magnetic head adapted to access a first surface of said magnetic disk, a second magnetic head adapted to move together with said first magnetic head and access a second surface of said magnetic disk, tracking control means for controlling the tracking of said first and second magnetic heads, signal transmitting means for sending signals to and receiving signals from said first and second magnetic heads and signal transmission control means for controlling said signal transmitting means, wherein said tracking control means comprises:

track centering control means for controlling the centering of said first or second magnetic head on a predetermined track by using a servo signal read by said first magnetic head; and track accessing control means for controlling all access of said first or second magnetic head to a track, which should be accessed, by determining a track number of a currently accessed track by a signal outputted from said second magnetic head, computing a first difference between the track number of the currently accessed track and that of a target track to be accessed, establishing a direction, in which said second magnetic head should be moved, and a speed, at which said second magnetic head should be moved, on the basis of the determined first difference, moving said second magnetic head in the established direction at the established speed, determining the number of tracks which the second magnetic head has traversed from a signal outputted from said moved second magnetic head, computing a second difference between the track number of the target track and the determined number of the tracks which the second magnetic head has traversed, and controlling the speed of said second magnetic head on the basis of the computed second difference.

6. A magnetic disk storage as set forth in claim 5, wherein said signal transmitting means includes:

head controlling means for controlling read/write operations of said first and second magnetic heads such that the read/write operations of said first and second magnetic heads are effected independently from each other;

dividing means for dividing digital data, which is to be stored in said magnetic disk storage and is represented by a plurality of bits, into two partial data and supplying the two partial data to said first and second magnetic heads which issue output signals when reading the partial data; and synthesizing means for receiving the output signals of said first and second magnetic heads and synthesizing a signal representing the digital data from the output signals.

7. The magnetic disk storage as set forth in claim 5, further comprising selection means for selecting the magnetic disk, to which data is written and a pair of corresponding first and second magnetic heads, from a plurality of magnetic disks and corresponding magnetic heads provided therein.

8. A method for accessing a track of a magnetic disk storage by using a pair of a first and second magnetic heads capable of respectively accessing a first and second surfaces of a magnetic disk and moving together with each other, said method comprises the steps of:

writing a servo signal to be used for the centering of said magnetic heads on a track into a sector other than data sectors used for storing data of each track on the first surface of said magnetic disk by using the first magnetic head;

writing a track address signal in a predetermined location of each track on the second surface of said magnetic disk by using the second magnetic head while the tracking of said magnetic heads is controlled in accordance with the servo signal read by using said first magnetic head;

determining a track number of a currently accessed track by a signal outputted from said second magnetic head;

computing a first difference between the track number of the currently accessed track and that of a target track to be accessed;

establishing a direction, in which said second magnetic head should be moved, and a speed, at which said second magnetic head should be moved, on the basis of the determined first difference;

moving said second magnetic head in the established direction at the established speed;

determining the number of tracks, which the second magnetic head has traversed, from a signal outputted from said moved second magnetic head;

computing a second difference between the track number of the target track and the determined number of the tracks, which the second magnetic head has traversed;

controlling the speed of said second magnetic head on the basis of the computed second difference;

stopping said second magnetic head on the target track;

controlling a centering of said first magnetic head on a track on the basis of the servo signal read by using said first magnetic head; and reading data from and writing data to the target track of each of the surfaces simultaneously by all heads.

9. The method for accessing a track on a magnetic disk storage as set forth in claim 8, wherein said step of reading data from and writing data to the target track further comprises:
- dividing a digital data represented by a plurality of bits to be written to said magnetic disk storage into first partial data represented by higher-order bits of the digital data and second partial data represented by lower-order bits of the digital data;
- writing the first and second partial data on the first and second surfaces of said magnetic disk; and
- reading the first and second partial data by using said first and second magnetic heads which output first and second signals respectively representing the first and second partial data; and
- reproducing a signal representing the digital data by synthesizing the first and second signals.

10. The method for accessing a track on a magnetic disk storage as set forth in claim 8, the disk storage including a plurality of magnetic disks, further comprising the steps of preliminarily selecting a magnetic disk from the plurality of magnetic disks and selecting a pair of said first and second magnetic heads corresponding to the selected magnetic disk.

11. A method for accessing a track on a magnetic disk storage as set forth in claim 8, wherein said step of reading data from and writing data to the target track further comprises:
- dividing a digital data represented by a plurality of bits to be written to said magnetic disk storage into a plurality of partial data each represented by a different one of the bits of the digital data;
- writing the partial data respectively on the surfaces of magnetic disks provided in said magnetic disk storage; and
- reading the partial data by using respective pairs of magnetic heads provided correspondingly to the magnetic disks which store the partial data, said magnetic heads issuing output signals respectively representing two partial data read thereby when reading the partial data; and
- reproducing a signal representing the digital data by synthesizing the output signals of said magnetic heads.

* * * * *